July 5, 1927.

B. J. ZOBEL

TIRE RIM

Filed March 29, 1926

B. J. Zobel INVENTOR

BY Victor J. Evans ATTORNEY

July 5, 1927.
B. J. ZOBEL
1,635,105
TIRE RIM
Filed March 29, 1926    2 Sheets-Sheet 2
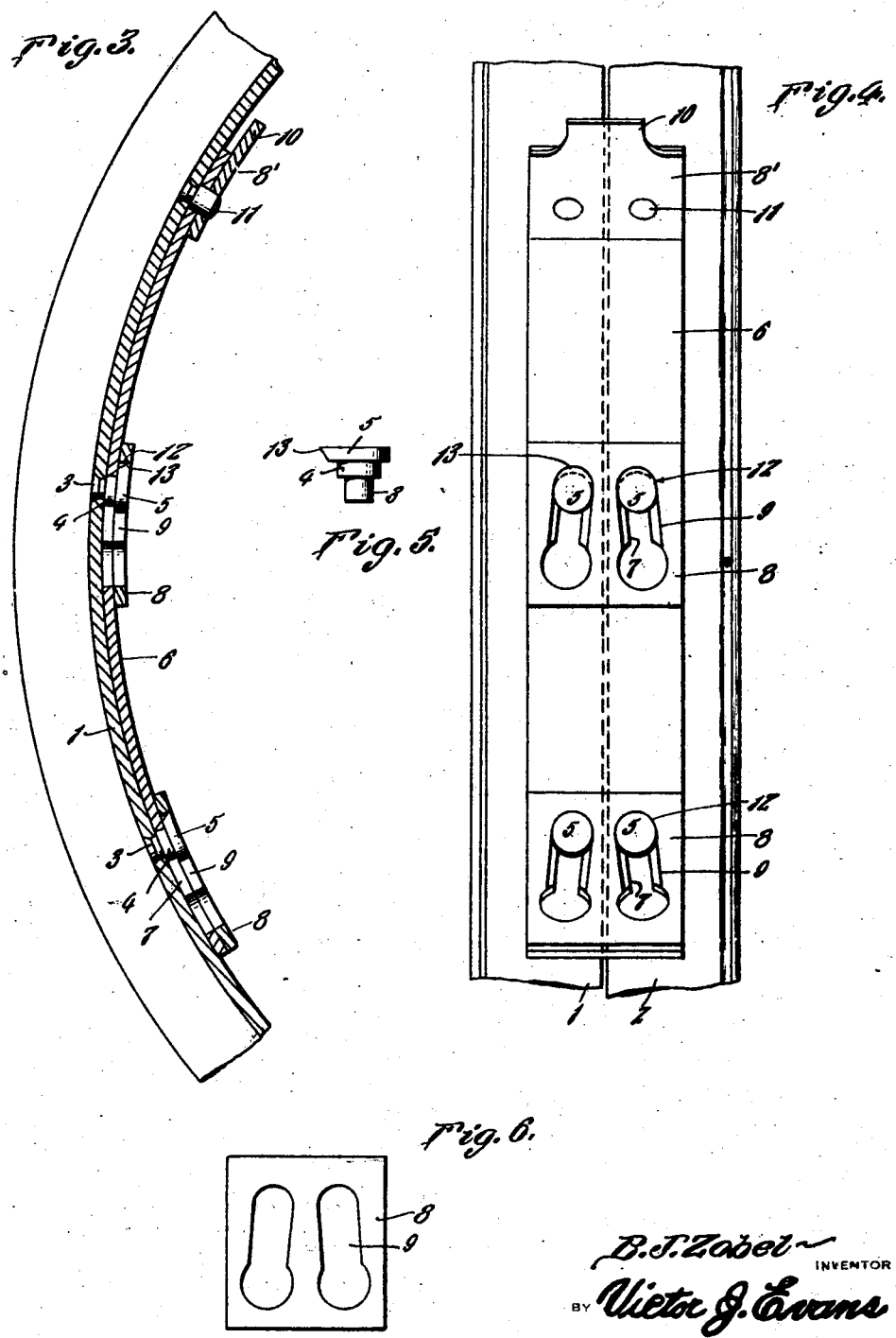

Patented July 5, 1927.

1,635,105

UNITED STATES PATENT OFFICE.

BENJAMIN J. ZOBEL, OF BUFFALO, NEW YORK.

TIRE RIM.

Application filed March 29, 1926. Serial No. 98,282.

This invention relates to a tire rim, the general object of the invention being to make the rim in two sections with means for locking the two sections together comprising a number of plates, each of which has inclined slots therein for engaging studs on the sections so that as the plate is moved in one direction, the sections will be brought together by the studs moving into the inner ends of the slots and when the plate is moved in an opposite direction, the sections are moved apart by the studs moving into the outer ends of the slots.

A further object of the invention is to provide means for locking each plate with the plate in position locking the sections together.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a circumferential sectional view through one of the locking plates and showing it in locking position.

Figure 4 is a fragmentary view showing the inner face of the rim with the locking plate in position.

Figure 5 is a view of one of the studs.

Figure 6 is a view of one of the reinforcing plates.

Figure 1:
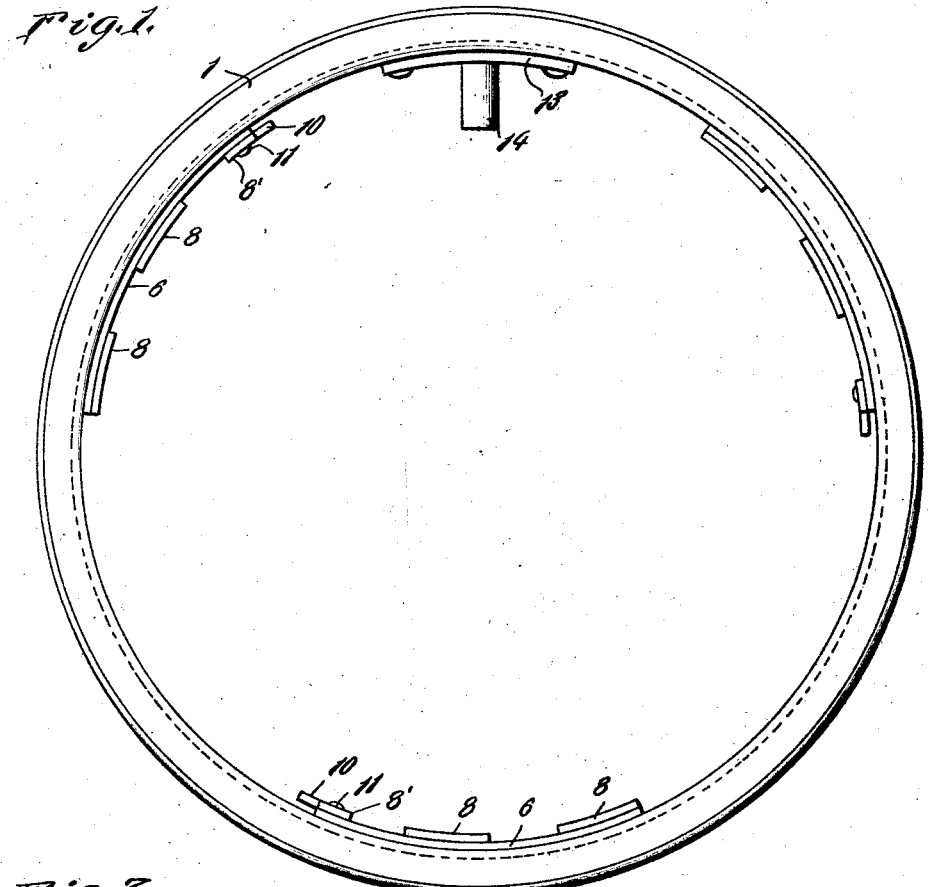
Figure 1 is a side elevational view of a rim constructed in accordance with this invention.
Figure 2:
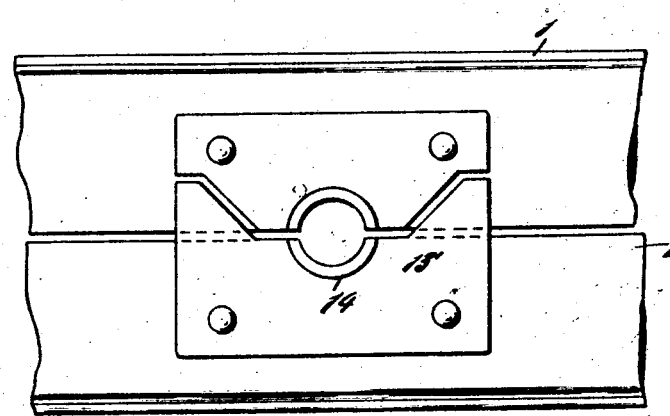
Figure 2 is a fragmentary view of the inner face of a rim showing the valve stem receiving member.

As shown in these views, the rim is divided circumferentially at its middle to provide the two sections 1 and 2. Each section has a number of inwardly extending studs 3, each of which comprises a small head 4 and a larger head 5 which is connected with the outer face of the head 4. A number of locking plates 6 are each provided with a number of pairs of convergent keyhole-shaped slots 7 and a reinforcing plate 8 is placed over each portion of the plate 6 which is formed with a pair of these slots 7. The reinforcing plates are suitably connected with the plate 6. Each reinforcing plate 8 is also provided with a pair of convergent keyhole-shaped slots 9 which register with the slots 7 but which have their straight parts of greater width than the straight parts of the slots 7. A reinforcing plate 8' is fastened to one end of the plate 6 and has a tongue 10 projecting beyond the end of said plate. Holes are formed in the plate 8' and the plate 6 for receiving small studs 11 carried by the two sections of the rim.

When the two sections of the rim are to be brought together to hold a tire between them, the locking plates 6 are placed against the inner faces of the sections, with the studs 3 engaging the large ends of the slots 7 and 9 in the plates 6 and in the reinforcing plates. As will be understood, in this position of the parts, the sections will be separated. Then the end of the locking plate carrying the reinforcing plate 8' is struck with a hammer or the like so that each locking plate will be moved on the sections, thus causing the slots in the locking member to move over the heads of the lugs, this bringing the lugs into the narrower parts of the slots which converge so that the lugs are moved toward each other and thus the inner ends of the two sections are brought into abutting relation. When the lugs reach the narrow ends of the slots, the holes will come over the studs 11 so that the spring nature of the locking plate will cause the lugs to enter the holes and thus lock the plate to the rim. Before the plate can be unlocked or freed from the lugs 3, a tool must be placed under the lip 10 to move this end of the locking plate away from the rim so that the locking plate will be freed of the lugs 11 and then the opposite end of the locking plate is struck with a tool to cause the same to slide on the rim and thus bring the heads of the lugs 3 at the large ends of the slots so that the locking plate can be removed from the rim and then the sections of the rim can be separated. The small head 4 of each lug 3 engages a slot 7 in the plate 6, while the large head 5 of each lug engages a slot 9 in a reinforcing plate 8.

From the foregoing, it will be seen that I have provided simple means for locking the two sections of a rim together so that a tire can be easily and quickly gripped between the two sections or removed therefrom as desired.

I prefer to flatten portions of the heads, as shown at 12, these flattened portions engaging the walls of the slots and providing greater contacting surfaces between the studs and the walls of the slots. I also form each head 5 with a beveled part 13 which acts as guiding means in the movement of the parts from the large end of the slots to the narrow part thereof.

A pair of guiding plates 13' is carried by the sections of the rim so as to facilitate the proper positioning of the two sections and each plate is provided with a semi-circular inwardly extending projection 14 which, when the sections are together, forms a tubular guide for the valve stem of the tire tube.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A rim of the class described comprising two sections, headed lugs on the inner faces of the sections, a locking plate having pairs of keyhole-shaped slots therein for receiving the lugs, each pair of slots being convergent so that when the locking plate is moved forwardly to cause the lugs to engage the narrow portions of the slots, the sections will be drawn together, said locking plate having a hole therein and a projection carried by the rim for engaging the hole when the locking plate is in locking position, said plate being of spring metal.

2. A rim of the class described comprising two sections, headed lugs carried by the sections, each lug having a pair of different sized heads, a locking plate having pairs of keyhole-shaped slots therein, each pair of slots being convergently arranged, reinforcing plates on the locking plate, each plate having a pair of keyhole-shaped slots therein which register with a pair of the slots in the main plate, the narrow parts of the slots in the reinforcing plate being wider than the narrow parts of the slots in the main plate and designed to receive the larger heads of the studs and means for locking the locking plate against endwise movement.

3. A rim of the class described comprising two sections, headed lugs carried by the sections, each lug having a pair of different sized heads, a locking plate having pairs of keyhole-shaped slots therein, each pair of slots being convergently arranged, reinforcing plates on the locking plate, each plate having a pair of keyhole-shaped slots therein which register with a pair of the slots in the main plate, the narrow parts of the slots in the reinforcing plate being wider than the narrow parts of the slots in the main plate and designed to receive the larger heads of the studs, means for locking the locking plate against endwise movement, such means comprising a reinforcing plate at one end of the main plate and having a part extending beyond the end of said end plate, holes in said main plate and said reinforcing plate and projections on the rim sections for engaging the holes when the locking plate is in locking position.

In testimony whereof I affix my signature.

BENJAMIN J. ZOBEL.